United States Patent [19]
Faigle

[11] Patent Number: 6,022,045
[45] Date of Patent: Feb. 8, 2000

[54] VEHICLE OCCUPANT PROTECTION APPARATUS

[75] Inventor: Ernst M. Faigle, Dryden, Mich.

[73] Assignee: TRW Vehicle Safety Systems Inc., Lyndhurst, Ohio

[21] Appl. No.: 09/046,467

[22] Filed: Mar. 23, 1998

[51] Int. Cl.[7] .................................................. B60R 21/26
[52] U.S. Cl. ........................................ 280/736; 280/742
[58] Field of Search .................................. 280/736, 737, 280/740, 741, 742, 735; 222/3

[56] References Cited

U.S. PATENT DOCUMENTS

| | | | |
|---|---|---|---|
| 4,006,919 | 2/1977 | Neuman | 280/736 |
| 4,021,058 | 5/1977 | Suzuki et al. | 280/737 |
| 5,516,147 | 5/1996 | Clark et al. | 280/737 |
| 5,566,976 | 10/1996 | Cuevas | 280/737 |
| 5,707,078 | 1/1998 | Swanberg et al. | 280/739 |
| 5,709,405 | 1/1998 | Saderholm et al. | 280/736 |
| 5,803,494 | 9/1998 | Headley | 280/741 |
| 5,820,162 | 10/1998 | Fink | 280/742 |
| 5,927,753 | 7/1999 | Faigle et al. | 280/735 |

FOREIGN PATENT DOCUMENTS 0745517  5/1996  European Pat. Off. .

OTHER PUBLICATIONS

International Patent Application No. WO 97/34785.

U.S. Patent Application Serial No. 08/906,042, filed Aug. 5, 1997, entitled "Vehicle Occupant Protection Apparatus".

U.S. Patent Application Serial No. 08/990,590, filed Dec. 15, 1997, entitled "Vehicle Occupant Protection Apparatus".

*Primary Examiner*—Christopher P. Ellis
*Assistant Examiner*—David R. Dunn
*Attorney, Agent, or Firm*—Tarolli, Sundheim, Covell, Tummino & Szabo L.L.P.

[57] ABSTRACT

An apparatus (10) includes a pressure vessel (16) and a valve assembly (20). The pressure vessel (16) includes a source of inflation fluid for an inflatable vehicle occupant protection device (14). The valve assembly (20) regulates an outlet flow of the inflation fluid from the pressure vessel (16), and includes a metering member (72) normally having an initial position defining an initial outlet flow area. The valve assembly (20) further comprises pyrotechnic material (112) which, when ignited, produces combustion products that develop a thrust which moves the metering member (72) to a subsequent position defining a subsequent outlet flow area greater than the initial outlet flow area.

14 Claims, 2 Drawing Sheets

6,022,045

VEHICLE OCCUPANT PROTECTION APPARATUS

FIELD OF THE INVENTION

The present invention relates to an apparatus for inflating an inflatable vehicle occupant protection device for helping to protect an occupant of a vehicle.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help protect the occupant from a forceful impact with parts of the vehicle as a result of the crash.

The manner in which the inflating air bag engages the vehicle occupant can be influenced by conditions such as the force with which the occupant moves against the air bag and the pressure of the inflation fluid in the air bag. Those conditions, in turn, can be influenced by vehicle conditions, such as the severity of the crash, and/or by vehicle occupant conditions, such as the size, weight and position of the occupant. Therefore, it may be desirable to regulate the inflation fluid pressure in the air bag in response to one or more of these conditions.

SUMMARY OF THE INVENTION

In accordance with the present invention, an apparatus comprises a pressure vessel and a valve assembly. The pressure vessel comprises a source of inflation fluid for an inflatable vehicle occupant protection device. The valve assembly regulates an outlet flow of the inflation fluid from the pressure vessel.

The valve assembly includes a metering member normally having an initial position defining an initial outlet flow area. The valve assembly further includes pyrotechnic material which, when ignited, produces combustion products that develop a thrust which moves the metering member to a subsequent position defining a subsequent outlet flow area greater than the initial outlet flow area.

In the preferred embodiments of the present invention, the pyrotechnic material is the sole source of energy for moving the metering member from the initial position to the subsequent position. Accordingly, such movement of the metering member is unaffected by inflation fluid pressure forces acting on the metering member.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

Figure 1:
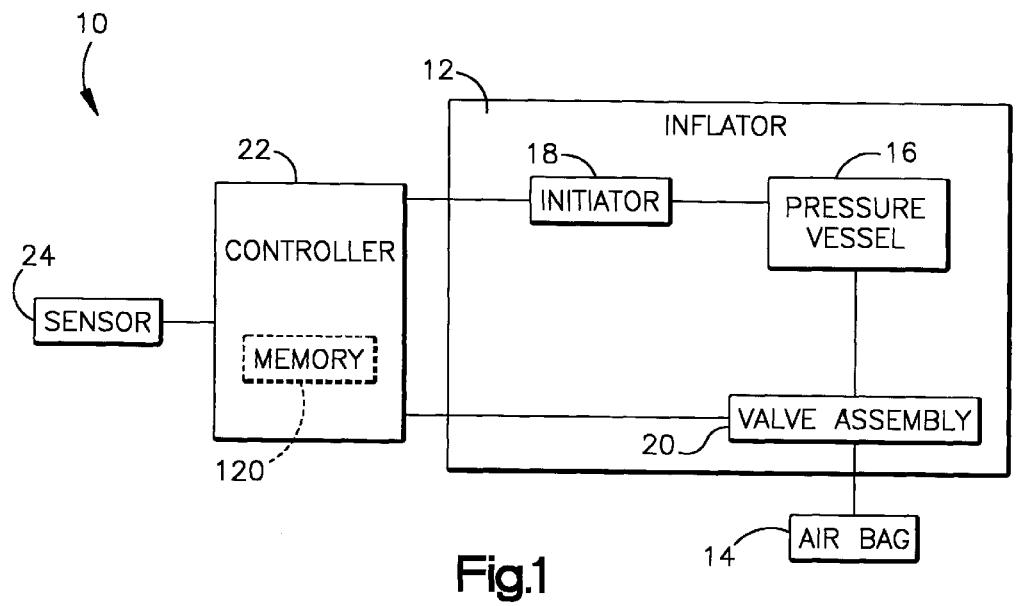
FIG. 1 is a block diagram of a vehicle occupant protection apparatus comprising a first embodiment of the present invention.

A vehicle occupant protection apparatus 10 comprising a first embodiment of the present invention is shown schematically in FIG. 1. The apparatus 10 includes an inflator 12 and a particular type of inflatable vehicle occupant protection device 14 which is known as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. When the air bag 14 is inflated, it extends into a vehicle occupant compartment (not shown) to help protect a vehicle occupant from a forceful impact with parts of the vehicle as a result of a crash.

The inflator 12 comprises a source 16 of inflation fluid for inflating the air bag 14. The source 16 of inflation fluid in the preferred embodiments of the present invention is a pressure vessel storing inflation fluid under pressure. A preferred inflation fluid consists essentially of helium at a storage pressure within the range of about 4,000 psi to about 7,000 psi. However, the inflation fluid stored in the pressure vessel 16 may have any other composition and storage pressure suitable for inflating the air bag 14. Moreover, the inflator 12 may alternatively contain a body of ignitable gas generating material or a combination of pressurized inflation fluid and ignitable material for heating the inflation fluid. The ignitable material could comprise a fuel gas or a combustible mixture of gases. Such a combustible mixture of gases would preferably have a composition in accordance with the invention set forth in U.S. Pat. No. 5,348,344, assigned to TRW Vehicle Safety Systems Inc.

The inflator 12 includes an initiator 18 and a valve assembly 20. The initiator 18 functions to open the pressure vessel 16 to initiate an outlet flow of inflation fluid from the pressure vessel 16. The valve assembly 20 functions to regulate the outlet flow of inflation fluid between the pressure vessel 16 and the air bag 14. A controller 22 actuates the initiator 18 and the valve assembly 20 in response to a deployment signal received from a crash sensor 24.

The crash sensor 24 is a known device that senses a vehicle condition indicating the occurrence of a crash. If the vehicle condition sensed by the crash sensor 24 is at or above a predetermined threshold level, it indicates the occurrence of a crash having at least a predetermined threshold level of severity. The threshold level of crash severity is a level at which inflation of the air bag 14 is desired to help protect a vehicle occupant. The crash sensor 24 then provides the controller 22 with a deployment signal.

The vehicle condition sensed by the crash sensor 28 preferably comprises sudden vehicle deceleration that is caused by a crash. If the magnitude and duration of the deceleration meet or exceed predetermined threshold levels, they indicate the occurrence of a crash that meets or exceeds the predetermined threshold level of crash severity. The deployment signal is then transmitted to the controller 22 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 14 is to be inflated.

The controller 22, which may comprise a known microprocessor, responds to the deployment signal by actuating the initiator 18 to open the pressure vessel 16 upon the occurrence of a crash. The controller 22 further responds to the deployment signal by controlling the valve assembly 20 with reference to the severity of the crash as indicated by the deployment signal.

Figure 2:
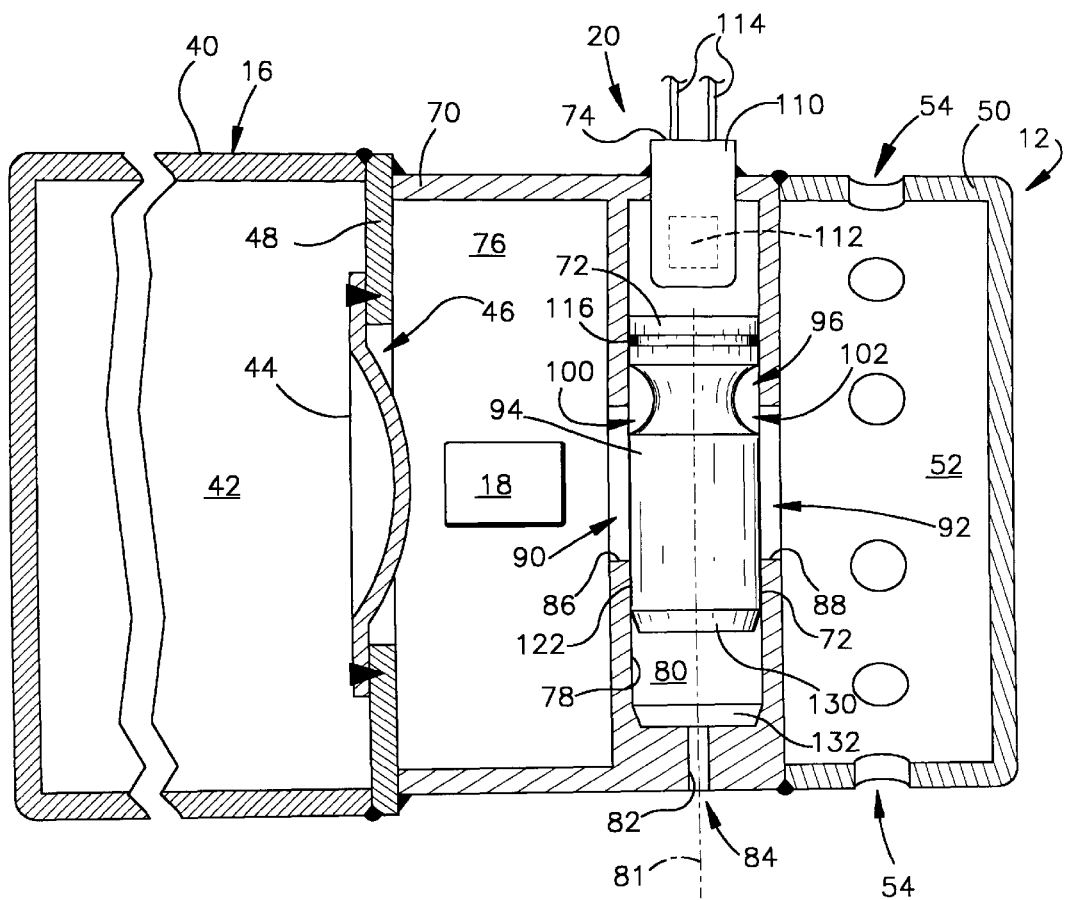
FIG. 2 is a side view, partly in section, of parts of the apparatus of FIG. 1.

As shown in FIG. 2, the pressure vessel 16 comprises a cylindrical tank 40 defining a storage chamber 42 containing the pressurized inflation fluid. A burst disk 44 closes an opening 46 in an end wall 48 of the tank 40. When the initiator 18 (shown schematically) is actuated, it ruptures the burst disk 44 to open the pressure vessel 16. The inflation fluid then begins to flow outward from the storage chamber 42 through the opening 46.

The initiator 18 may comprise any known device suitable for rupturing the burst disk 44. If a fuel gas or other ignitable material were used to heat the inflation fluid, as noted above, the inflator 12 could be provided with an igniter separate from the initiator 18. Alternatively, t he initiator 18 could comprise a known device that functions to rupture the burst disk 44 and also to ignite the ignitable material. However, the inflator 12 in the preferred embodiments of the present invention does not have such an ignitable material. When the initiator 18 ruptures the burst disk 44, the unheated inflation fluid begins to flow outward through the opening 46 under the influence of the pressure in the storage chamber 42. The pressure in the storage chamber 42 continuously decreases from the storage level to the ambient level as the unheated inflation fluid flows outward.

The inflator 12 further includes a diffuser 50. The diffuser 50 defines a diffuser chamber 52, and has a plurality of inflation fluid exit openings 54 which direct inflation fluid from the inflator 12 toward the air bag 14 (FIG. 1). The valve assembly 20, which is operatively disposed between the pressure vessel 16 and the diffuser 50, includes a housing structure 70 and a metering member 72 supported for movement within the housing structure 70. The valve assembly 20 further includes an actuator 74 comprising a source of energy for moving the metering member 72.

The housing structure 70 defines an intermediate fluid chamber 76 beside the opening 46 in the end wall 48 of the pressure vessel 16. A cylindrical inner surface 78 of the housing structure 70 defines a bore 80 with a longitudinal central axis 81. A smaller cylindrical inner surface 82 defines an air vent 84 extending outward from the bore 80 along the axis 81. The housing structure 70 further has a pair of annular inner surfaces 86 and 88. The first annular inner surface 86 defines an inlet port 90 communicating the intermediate chamber 76 with the bore 80. The second annular inner surface 88 defines an outlet port 92 communicating the bore 80 with the diffuser chamber 52.

The metering member 72 in the preferred embodiments of the present invention is a spool which is movable longitudinally along the axis 81 of the bore 80. A cylindrical land 94 on the spool 72 is located next to a circumferentially extending groove 96 in the spool 72. The spool 72 and the housing structure 70 together define inlet and outlet orifices 100 and 102 between the groove 96 and the inlet and outlet ports 90 and 92.

The actuator 74 in the preferred embodiments of the present invention is a device which is known as a squib, and includes a cylindrical casing 110 projecting axially into the bore 80. A small charge of pyrotechnic material 112 is contained in the casing 110. The pyrotechnic material 112 is ignited in a known manner upon the passage of electric current through the squib 74 between a pair of leads 114 extending from the casing 110.

The valve assembly 20 normally has an open condition. The valve assembly 20 may, for example, normally have the open condition in which it is shown in FIG. 2. The spool 72 is then located in an initial position such that the inlet and outlet orifices 100 and 102 provide initial flow areas at the inlet and outlet ports 90 and 92. When the pyrotechnic material 112 in the squib 74 is ignited, it rapidly produces combustion products which are spewed into the bore 80 between the casing 110 and the spool 72. The combustion products develop a thrust which moves the spool 72 downward, as viewed in FIG. 2, along the axis 81. This causes the orifices 100 and 102 to enlarge and thereby to increase the flow areas at the ports 90 and 92. An O-ring 116 located on the spool 72 between the groove 96 and the squib 74 helps to block the combustion products from mixing with the inflation fluid flowing through the valve assembly 20.

As further shown in FIG. 1, the controller 22 has a memory location 120. The memory location 120 stores data comprising a plurality of predetermined modes of operation for the valve assembly 20. These include a non-ignition mode in which the pyrotechnic material 112 in the squib 74 is not ignited, and further include a plurality of ignition modes in which the pyrotechnic material 112 is ignited.

When the initiator 18 is actuated upon the occurrence of a vehicle crash, the flow areas initially provided by the orifices 100 and 102 help to maintain a soft initial stage of inflation by limiting the flow rates through the ports 90 and 92 and the groove 96 in the valve assembly 20. If the severity of the crash is relatively low, the controller 22 may respond by selecting the non-ignition mode of operation for the valve assembly 20. The valve assembly 20 will then remain in its normally open condition.

The controller 22 will respond to a higher level of crash severity by selecting an ignition mode of operation for the valve assembly 20. The controller 22 will then cause the pyrotechnic material 112 to be ignited so that the spool 72 will be moved to a position in which the orifices 100 and 102 provide subsequent flow areas that are greater than the initial flow areas. This enables the inflation fluid to flow outward through the valve assembly 20 at correspondingly greater flow rates under the influence of the pressure in the storage chamber 42.

Each of the ignition modes of actuation comprises a delay time between actuation of the initiator 18 and ignition of the pyrotechnic material 112. The delay time determines the duration of the soft initial stage of inflation that occurs before the valve assembly 20 is shifted to a further opened condition. Therefore, if the severity of the crash is of an intermediate level, the controller 22 will select an ignition mode having a relatively long delay time to provide a relatively long initial stage of inflation. If the crash severity is of a higher level, the controller 22 will select an ignition mode having a shorter delay time to provide a shorter initial stage of inflation. If the crash severity is of a highest level, the controller 22 will select an ignition mode having a delay time of zero, i.e., an ignition mode in which the pyrotechnic material 112 is ignited simultaneously with actuation of the initiator 18. This will effectively omit an initial stage of inflation.

In accordance with a particular feature of the present invention, a cylindrical outer surface 122 of the land 94 of the spool 72 engages the cylindrical inner surface 78 of the housing structure 70 in an interference fit. The interference fit is tight enough to prevent the spool 72 from moving under th e influence of inflation fluid pressure forces acting on the spool 72. Accordingly, the pyrotechnic material 112 in the squib 74 is the sole source of energy for moving the spool 72 in the bore 80. The controller 22 thus has sole control of shifting of the valve assembly 20 from its normally open condition to a further opened condition. This ensures that the increased outlet flow areas through the ports 90 and 92 will be provided at the time called for by the particular mode of operation selected by the controller 22.

In accordance with another particular feature of the present invention, the spool 72 has a beveled end surface 130 facing an opposed beveled inner surface 132 of the housing structure 70 at the end of the bore 80. The thrust developed by the combustion products in the bore 80 moves the spool 72 fully to a final position in which the beveled end surface 130 is wedged against the beveled inner surface 132 in an interference fit. The interference fit of the beveled surfaces 130 and 132 prevents rebound of the spool 72. The spool 72 is thus supported for movement in the bore 80 in only one direction, and is moved fully to the same final position in any one of the ignition modes of operation of the valve assembly 20.

Figure 3:
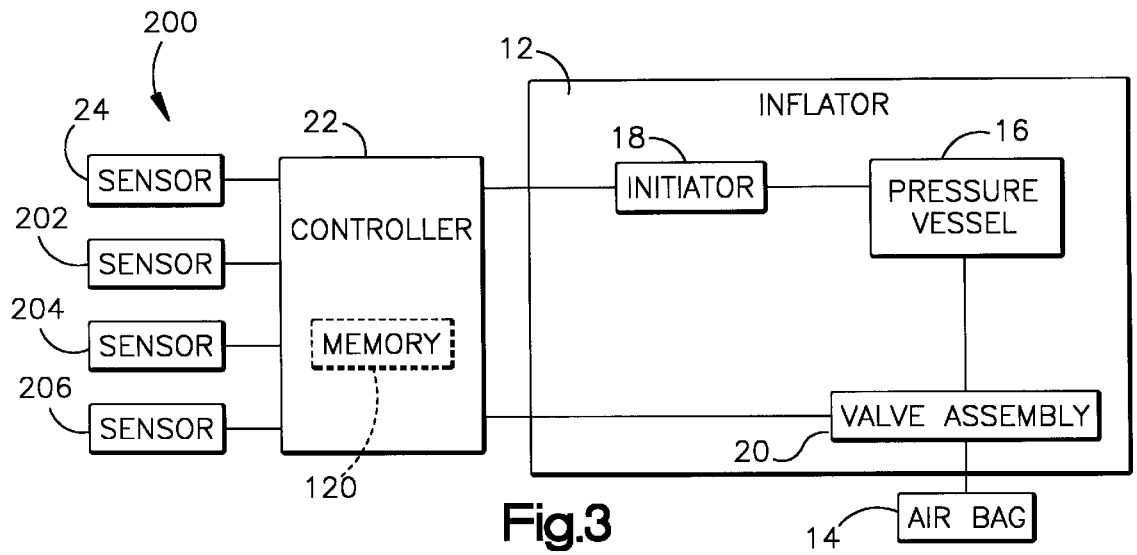
FIG. 3 is a block diagram of a vehicle occupant protection apparatus comprising a second embodiment of the present invention.

A vehicle occupant protection apparatus 200 comprising a second embodiment of the present invention is shown schematically in FIG. 3. The apparatus 200 includes a vehicle occupant condition sensor 202, a vehicle seat condition sensor 204, and a seat belt buckle sensor 206. The apparatus 200 is otherwise the same as the apparatus 10, as indicated by the use of the same reference numbers in FIGS. 3 and 1.

The occupant condition sensor 202 provides a signal indicating one or more conditions of a vehicle occupant. These can be the occupant's height, weight and/or position. The seat condition sensor 204 provides a signal indicating a condition of the occupant's seat. This could be the seat back angle or the forward/rearward position of the seat. The buckle sensor 206 provides a signal indicating whether or not the occupant is wearing a seat belt.

The controller 22 in the second embodiment uses the signals from the sensors 202–204, along with the signal from the crash sensor 24, to control the valve assembly 20. In this manner, the controller 22 can select a mode of operation for the valve assembly 20 that is most appropriate for the concurrent crash conditions indicated by the sensors 24 and 202–206.

Figure 4:
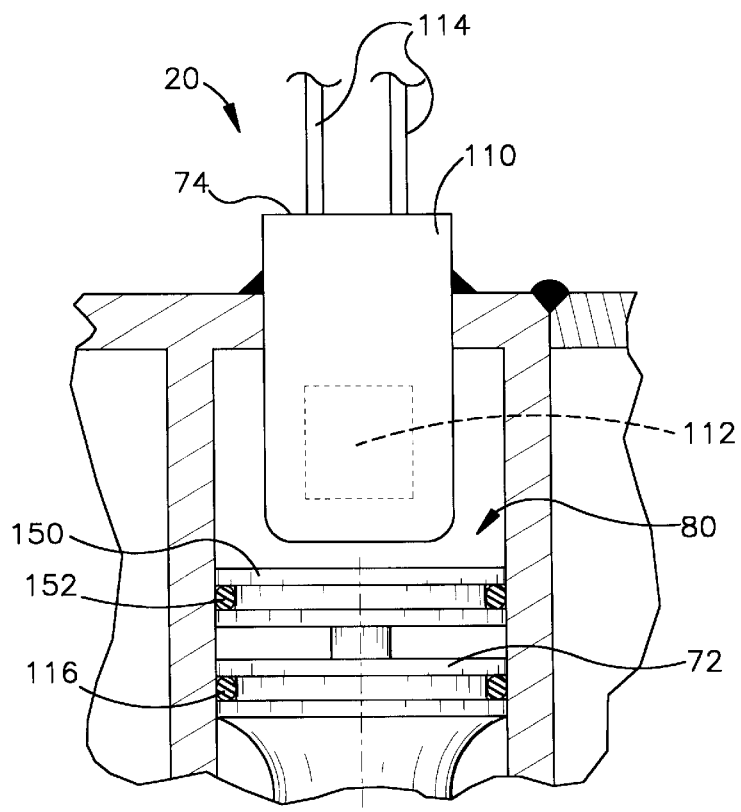
FIG. 4 is an enlarged, partial view similar to FIG. 2 showing parts of a third embodiment of the present invention.

A third embodiment of the present invention is shown partially in FIG. 4. The third embodiment has many parts that are substantially the same as corresponding parts of the first and second embodiments. This is indicated by the use of the same reference numbers for such corresponding parts in FIGS. 4 and 2. The third embodiment further includes a piston 150 which is interposed between the squib 74 and the spool 72 in the bore 80. The thrust provided by the squib 74 acts directly against the piston 150 rather than the spool 72. The piston 150 then drives the spool 72 from the initial position to the subsequent position under the influence of the thrust. The piston 150, as well as an O-ring 152 on the piston 150, further helps to prevent the combustion products from entering the outlet flow of inflation fluid passing through the valve assembly 20.

From the above description of the invention, those skilled in the art will perceive improvements, changes and modifications. For example, the crash conditions sensed by the sensors 24 and 202–206 are described by way of example only. Other vehicle or vehicle occupant conditions also could be considered for controlling a valve assembly in accordance with the present invention. Such improvements, changes and modifications within the skill of the art are intended to be covered by the appended claims.

Having described the invention, the following is claimed:

1. Apparatus comprising:

a pressure vessel comprising a source of inflation fluid for an inflatable vehicle occupant protection device; and a valve assembly which regulates an outlet flow of said inflation fluid from said pressure vessel;

said valve assembly including a metering member normally having an initial position defining an initial open outlet flow area;

said valve assembly further including pyrotechnic material which, when ignited, produces combustion products that develop a thrust which moves said metering member to a subsequent position defining a subsequent outlet flow area greater than said initial outlet flow area.

2. Apparatus as defined in claim 1 wherein said pyrotechnic material is the sole source of energy for moving said metering member from said initial position to said subsequent position, whereby said movement of said metering member is unaffected by inflation fluid pressure forces acting on said metering member.

3. Apparatus as defined in claim 1 further comprising means for preventing rebound of said metering member from said subsequent position toward said initial position.

4. Apparatus as defined in claim 1 further comprising a piston and means for supporting said piston to drive said metering member from said initial position to said subsequent position under the influence of said thrust.

5. Apparatus as defined in claim 1 further comprising control means for responding to a vehicle crash by controlling said valve assembly in a selected one of a plurality of differing modes corresponding to a plurality of differing conditions, said differing modes including an ignition mode in which said control means causes said pyrotechnic material to ignite, and further including a non-ignition mode in which said control means does not cause said pyrotechnic material to ignite.

6. Apparatus as defined in claim 5 wherein said ignition mode is one of a plurality of ignition modes that call for said pyrotechnic material to be ignited at a corresponding plurality of differing times.

7. Apparatus as defined in claim 6 further comprising means for supporting said metering member for movement fully to the same final position in any one of said ignition modes.

8. Apparatus as defined in claim 1 further comprising an inflatable vehicle occupant protection device, said valve assembly being located in an inflation fluid flow path extending from said pressure vessel to said protection device through said valve assembly.

9. Apparatus as defined in claim 8 wherein said pressure vessel and said valve assembly are parts of an inflator having an exit opening which directs said outlet flow of inflation fluid from said inflator, said valve assembly being located in said flow path between said pressure vessel and said exit opening.

10. Apparatus comprising:

a pressure vessel comprising a source of inflation fluid;

a valve assembly which regulates an outlet flow of said inflation fluid from said pressure vessel, said valve assembly normally having an open condition and including pyrotechnic material which, when ignited, produces combustion products that shift said valve assembly to a further opened condition; and control means for responding to a vehicle crash by controlling said valve assembly in a selected one of a plurality of differing modes corresponding to a plurality of differing conditions;

said differing modes including an ignition mode in which said control means causes said pyrotechnic material to ignite and further including a non-ignition mode in which said control means does not cause said pyrotechnic material to ignite.

11. Apparatus as defined in claim 10 wherein said ignition mode is one of a plurality of ignition modes that call for said pyrotechnic material to be ignited at a corresponding plurality of differing times.

12. Apparatus as defined in claim 10 wherein said control means solely has control of said shifting of said valve assembly, whereby said shifting of said valve assembly is unaffected by inflation fluid pressure forces acting on said valve assembly.

13. Apparatus as defined in claim 10 further comprising an inflatable vehicle occupant protection device, said valve assembly being located in an inflation fluid flow path extending from said pressure vessel to said protection device through said valve assembly.

14. Apparatus as defined in claim 13 wherein said pressure vessel and said valve assembly are parts of an inflator having an exit opening which directs said outlet flow of inflation fluid from said inflator, said valve assembly being located in said flow path between said pressure vessel and said exit opening.

* * * * *